(12) United States Patent
Hendrickson et al.

(10) Patent No.: US 8,792,766 B2
(45) Date of Patent: Jul. 29, 2014

(54) TOOL FOR ROUTING AN OPTICAL FIBER OR CABLE AT A LIVING UNIT OF CUSTOMER PREMISES

(75) Inventors: Daniel Hendrickson, Roswell, GA (US); Paul R. Dickinson, Johns Creek, GA (US)

(73) Assignee: OFS Fitel, LLC, Norcross, GA (US)

( * ) Notice: Subject to any disclaimer, the term of this patent is extended or adjusted under 35 U.S.C. 154(b) by 688 days.

(21) Appl. No.: 12/986,990

(22) Filed: Jan. 7, 2011

(65) Prior Publication Data

US 2012/0020635 A1 Jan. 26, 2012

Related U.S. Application Data

(60) Provisional application No. 61/365,970, filed on Jul. 20, 2010, provisional application No. 61/371,828, filed on Aug. 9, 2010.

(51) Int. Cl.
*G02B 6/00* (2006.01)

(52) U.S. Cl.
USPC .......................................................... 385/135

(58) Field of Classification Search
None
See application file for complete search history.

(56) References Cited

U.S. PATENT DOCUMENTS

| | | | |
|---|---|---|---|
| 3,111,440 A | 11/1963 | Prentice | |
| 3,639,193 A | 2/1972 | Hawkins | |
| 5,022,600 A | 6/1991 | Blanc et al. | |
| 6,533,205 B1 | 3/2003 | Kles | |
| 6,554,217 B1 | 4/2003 | Rodriguez | |
| 7,035,519 B2 * | 4/2006 | Segroves et al. | 385/134 |
| 7,120,349 B2 | 10/2006 | Elliott | |
| 7,235,608 B2 | 6/2007 | Hu et al. | |
| 7,266,283 B2 | 9/2007 | Kline et al. | |
| 7,302,155 B2 * | 11/2007 | Weinert et al. | 385/137 |
| 7,343,077 B2 | 3/2008 | Mann et al. | |
| 7,493,006 B2 * | 2/2009 | Welnert et al. | 385/137 |

(Continued)

FOREIGN PATENT DOCUMENTS

DE 827372 1/1952
DE 34 30 138 A1 2/1986

(Continued)

OTHER PUBLICATIONS

European Patent Office, Full Search Report for EP Application No. 11166536.0, Sep. 23, 2011.

(Continued)

*Primary Examiner* — Tina Wong
(74) *Attorney, Agent, or Firm* — Law Offices of Leo Zucker

(57) ABSTRACT

A tool for routing an optical fiber or a cable over a desired span on a visible supporting surface at a given premises. The tool includes a rod with a handle, and a reel or spool is mounted on the rod for storing a length of an optical fiber or a cable to be routed. An adhesive coating assembly is fixed on the rod for providing an adhesive on the fiber when the fiber is unwound from the spool during use of the tool. A fiber routing applicator is disposed at the distal end of the rod. The routing applicator is dimensioned and arranged to travel over the supporting surface at the premises to route the fiber with the adhesive thereon over the desired span, while urging the fiber against the surface so that the fiber adheres to the surface.

8 Claims, 4 Drawing Sheets

(56) References Cited

U.S. PATENT DOCUMENTS

| | | | |
|---|---|---|---|
| 7,680,386 B2 | 3/2010 | Hurley | |
| 7,715,679 B2 | 5/2010 | Kowalczyk et al. | |
| 8,238,707 B2 * | 8/2012 | Smrha et al. | 385/135 |
| 8,295,670 B2 * | 10/2012 | Berglund et al. | 385/138 |
| 8,306,380 B2 * | 11/2012 | Leatherman et al. | 385/134 |
| 8,360,127 B2 * | 1/2013 | Thompson et al. | 156/574 |
| 2004/0042754 A1 * | 3/2004 | Arima et al. | 385/135 |
| 2005/0145522 A1 | 7/2005 | Bloodworth et al. | |
| 2008/0187276 A1 | 8/2008 | Roberts et al. | |
| 2009/0074370 A1 | 3/2009 | Kowalczyk et al. | |
| 2010/0054680 A1 | 3/2010 | Lochkovie et al. | |
| 2012/0294580 A1 * | 11/2012 | Burek et al. | 385/135 |

FOREIGN PATENT DOCUMENTS

| | | |
|---|---|---|
| DE | 195 33 766 C1 | 10/1996 |
| DE | 196 49 648 C1 | 12/1997 |
| DE | 197 44 006 A1 | 4/1999 |
| DE | 198 27 591 A1 | 12/1999 |
| EP | 343057 A1 | 11/1989 |
| GB | 2424128 A | 9/2006 |
| JP | 06-059137 | 3/1994 |

OTHER PUBLICATIONS

European Patent Office, Partial European Search Report for EP Appl'n. No. 11166536.0, Jul. 11, 2011.

* cited by examiner

TOOL FOR ROUTING AN OPTICAL FIBER OR CABLE AT A LIVING UNIT OF CUSTOMER PREMISES

CROSS REFERENCE TO RELATED APPLICATIONS

The present application claims priority under 35 U.S.C. §119(e) of U.S. Provisional Patent Applications No. 61/365,970 filed Jul. 20, 2010, and No. 61/371,828 filed Aug. 9, 2010, both entitled "Home Fiber Routing System" and incorporated herein by reference.

BACKGROUND OF THE INVENTION

1. Field of the Invention

This invention relates to the installation of an optical fiber or cable over a desired span at a customer premises.

2. Discussion of the Known Art

U.S. Pat. No. 7,266,283 (Sep. 4, 2007) describes fiber optic storing and dispensing apparatus. The patented apparatus includes a casing containing a rotatable spool, wherein a long and a short length of a fiber optic jumper cable are coiled in corresponding grooves on the spool. Both ends of the cable are coupled to connectors. One length of the jumper cable is extendable a certain distance from the casing to establish a first connection at one end of the cable. The other length is then manually uncoiled from the spool for making a second connection at the opposite end of the cable. The patent notes (col. 5, lines 32-39) that once the jumper cable is connected at both ends, the casing may be mounted on a junction box via magnetic strips to provide a removable support for the casing.

U.S. Patent Application Pub. No. 2008/0187276 (Aug. 7, 2008) discloses a flexible optical fiber tape including an adhesive substrate strip, and at least one optical fiber maintained by the strip. According to the patent, the strip may be adhered along with the fiber to a wall, floor, or ceiling in indoor applications.

As far as is known, no tool, system or technique has been disclosed that will enable an installer to route an optical fiber or cable on a wall, ceiling or other visible structural surface in a room or office, without the use of ladders and while standing at a distance from the surface.

SUMMARY OF THE INVENTION

According to the invention, a tool for routing optical fiber or cable over a desired span on a structural surface at a given premises, includes a rod having a handle, and a reel or spool mounted on the rod for storing a length of the fiber or cable to be routed. An adhesive coating assembly is fixed on the rod for providing an adhesive on the fiber when the fiber is operatively unwound from the spool, and a fiber routing applicator is disposed at the distal end of the rod. The routing applicator is dimensioned and arranged to travel over the surface to route the fiber with the adhesive thereon over the desired span, while urging the fiber against the surface so that the fiber becomes adhered to the surface.

For a better understanding of the invention, reference is made to the following description taken in conjunction with the accompanying drawing and the appended claims.

DETAILED DESCRIPTION OF THE INVENTION

The inventive system allows an optical fiber or cable to be routed along a structural surface (e.g., a wall or ceiling) associated with a living unit at a given premises, using a limited amount of hardware and with little if any visible profile. Unless otherwise stated, the terms "optical fiber" and "cable" are used interchangeably herein to connote one or more lengths of optical fibers, each of which may or may not be protectively enclosed by an outer cable jacket. Further, as used herein, the term "structural surface" refers to any visible or exposed surface of the walls, ceiling, or floor associated with a given living unit (e.g., a room or an office) at a customer premises.

Figure 1:
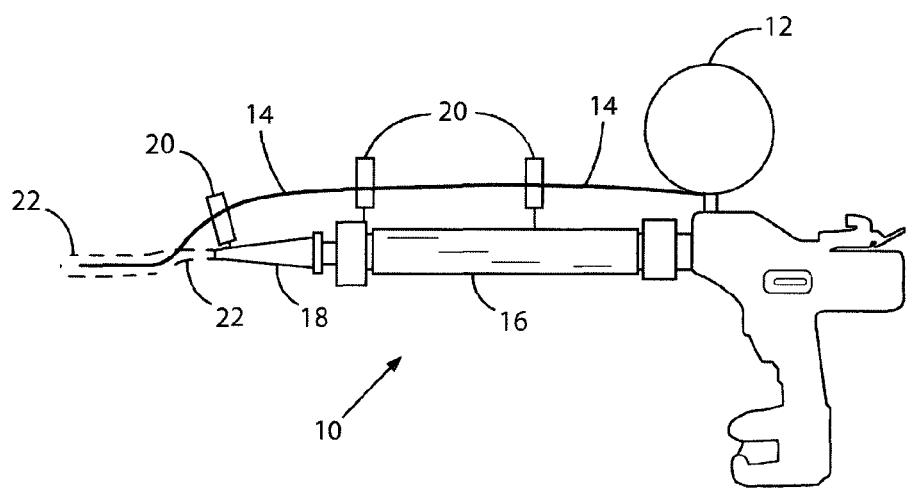
FIG. 1 illustrates a first embodiment of a fiber optic cable routing system according to the invention.

In FIG. 1, a hand-held tool gun device 10 has a construction that is generally the same or similar to a conventional mechanical or electrically powered caulking gun. The device 10 also includes a reel or spool 12 on which a length of an optical fiber or cable 14 is wound. The spool 12 is mounted near a proximal trigger end of the gun device 10, so that the fiber 14 unwinds from the spool while it is being routed by the device over a desired span on a wall, ceiling, or other structural surface at a user's premises. The opposite ends of the fiber 14 may be unterminated, or terminated at one or both ends with specified connectors. A replaceable cartridge 16 containing a caulking or an adhesive is arranged for insertion in the gun device 10. The cartridge 16 has an applicator tip 18 that projects from a distal end of the gun device 10 when the cartridge 16 is operatively inserted in the device.

The spool 12 may also have an optical termination unit or box (also known as a "rosette") detachably fastened on one side of the spool. See the fiber storage spool 202 with attached rosette 208 in the embodiment of FIGS. 5 to 9. In such an arrangement, the spool 12 and the rosette may be mounted on or within a cradle or mount that is attached to the gun device 10, so that the fiber 14 pays out or unwinds from the spool 12 while the fiber is being routed by the device 10 over a desired span.

The fiber 14 may comprise, for example, a 250 μm bare optical fiber, a 900 μm tight buffered fiber, or cordage comprising a 900 μm buffered fiber covered with aramid yarn and an outer jacket. The spool 12 may be constructed and arranged in a known manner for easy mounting on the gun device 10, and for quick removal when the wound fiber 14 is exhausted or when another spool containing a different type of fiber or cable is desired. One or more rings or loops 20 are preferably fixed at intervals along the length of the cartridge 16 or other portion of the device body, for guiding the fiber 14 as it unwinds from the spool 12 toward the applicator tip 18.

During use of the gun device 10, the fiber 14 unwinds or pays out from the spool 12 to be deposited on a structural surface over the desired span, together with the caulking or the adhesive 22 from the device cartridge 16. The applicator tip 18 and the guide rings 20 are dimensioned and arranged so that the adhesive 22 will flow over the fiber 14 and bind the fiber to the surface, while providing strain relief for the fiber at the same time.

The cartridge 16 may contain and dispense a commercially available silicone or acrylic based caulking. If it is necessary to recess the fiber or cable 14 below a structural surface (for example, the surface may be a living room ceiling or a sheet rock wall), the gun device 10 may also be provided with a cutting blade arranged at the distal end of the device for forming a furrow or a trough in the surface, in situ. This would allow the device to lay the fiber 14 in the cut trough before the caulking or adhesive 22 from the applicator tip 18 is deposited over the fiber.

Alternatively, the fiber 14 may be precoated with a dry adhesive, and the cartridge 16 can be arranged to dispense water or other liquid substance for activating the adhesive on the fiber as it passes in the vicinity of the cartridge applicator tip 18. For routing over rough surfaces, the fiber 14 may include an outer foam layer in which the adhesive is impregnated and becomes subject to activation when a liquid is applied on the outer surface of the foam layer. Liquid activated adhesives are disclosed in, e.g., U.S. Pat. No. 7,235,608 (Jun. 26, 2007), U.S. Pat. No. 5,296,535 (Mar. 22, 1994), U.S. Pat. No. 4,719,264 (Jan. 12, 1988), U.S. Pat. No. 4,639,395 (Jan. 27, 1987), U.S. Pat. No. 4,575,525 (Mar. 11, 1986), U.S. Pat. No. 4,322,472 (Mar. 30, 1982), and U.S. Pat. No. 3,988,495 (Oct. 26, 1976), all relevant portions of which are incorporated by reference.

Figure 2:
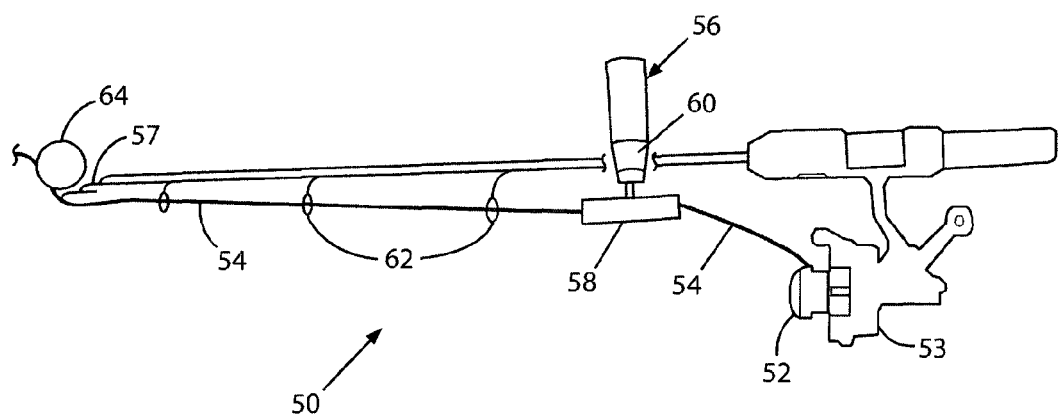
FIG. 2 illustrates a second embodiment of the inventive fiber optic cable routing system including an applicator tool.

FIG. 2 shows a second embodiment of the invention. In FIG. 2, an applicator tool 50 is constructed generally the same or similar to a conventional fishing rod. A reel or spool 52 with a length of optical fiber 54 wound on the spool, is placed in a mount 53 near a proximal handle end of the tool 50. The mount 53 may be the same or similar to the mount 228 in FIG. 9, so that fiber 54 unwinds or pays out from the spool 52 while the fiber is being routed by the tool 50 over a desired span. The opposite ends of the fiber 54 may be unterminated, or terminated at one or both ends with specified connectors.

An advantage of the tool 50 in FIG. 2 is that it allows an installer to route the spooled fiber 54 on and along a high ceiling or other location while standing at a remote position, without the use of ladders or the need for additional assistance or personnel. One or more rings, loops, tubes, channels or equivalent guide elements 62 are preferably fixed along the length of the rod of the tool 50, to guide the fiber 54 safely toward the distal end 57 of the tool 50 as the fiber is unwound from the spool 52.

An adhesive coating assembly 56, including an associated adhesive applicator tube or passage 58 and an adhesive cartridge 60, are mounted on the applicator tool 50 downstream from the spool 52. The fiber 54 is guided to pass through the passage 58 after leaving the spool 52. The assembly 56 is operative to supply a determined amount of an adhesive substance from the cartridge 60 into the interior of the passage 58 as the fiber 54 moves through the passage, so that a thin coating of the adhesive is applied on the outside surface of the fiber 54.

Alternatively, and as described above in relation to the embodiment of FIG. 1, the fiber 54 may be precoated with a dry adhesive, and the assembly 56 may be configured to provide a determined amount of water or other liquid substance to activate the coating on the fiber as it moves through the applicator passage 58. The dry adhesive formulation should be selected so that when activated, it will provide satisfactory adhesion between the outer surface of the fiber 54 and the structural surface on which the fiber is being routed. The dry adhesive may also be formulated to work with an existing coating on the fiber, e.g., PVC, nylon, urethane, acrylate, or others. All process aids should be selected to optimize the adhesion of the fiber to the structural surface, or within the groove or channel in which the fiber will be recessed.

The applicator tool 50 preferably has a small wheel, roller, or other fiber routing applicator 64 disposed at the distal end 57 of the tool to aid the installer to position the coated fiber 54 accurately on a structural surface, and to urge the fiber against the surface so that the fiber will bond properly with the surface over the desired span. Further, a portion of the tool 50 between the handle and the distal end 57 may be made to telescope or be extendable, so that the installer can route the fiber over the desired span on the structural surface while holding the tool a distance away from the surface and while standing. A desired minimum bend radius of, e.g., 7 mm may be maintained for the fiber 54 using a conventional outside corner guide.

According to a third embodiment of the invention, a conventional adhesive transfer tape dispenser is loaded with a reel or spool containing a supply of adhesive tape. Before the tape is wound on the spool, an optical fiber or cable is adhered along the length of the tape, on either side of the tape. Alternatively, the dispenser may be constructed and arranged to pay out the adhesive tape and the fiber separately and simultaneously from two different spools. The tape and the fiber may then be guided from the spools to approach one another near the structural surface so that the tape overlies the fiber when the tape is adhered on the surface. Dual spool tape dispensers, such as, e.g., models ATG-700, -714 or -752 from 3M Company, or model H-1221 from ULINE, are presently available and may be modified accordingly in a known manner.

Either arrangement has the advantage that once the tape and the underlying fiber are applied by the dispenser along a wall, ceiling or other structural surface, the fiber will not become embedded in a caulking or adhesive material that would prevent the fiber from being removed safely after routing in a home or office environment. The grade of the adhesive tape may be selected according to the degree of permanency desired for the fiber installation.

FIGS. 3 to 9 show a fiber or cable routing system 200 wherein the applicator tool 50 of FIG. 2 may be adapted to operate with a fiber storage spool 202 containing, e.g., about 75 to 100 feet of optical fiber or cable 204, and a pair of optical termination units or boxes 206, 208 (sometimes called "rosettes") each of which is detachably fastened to a corresponding side wall or flange 202a, 202b of the spool 202. The fiber or cable 204 may comprise, for example, a single 900 μm fiber, 1.2 mm cordage, or optical bundles or ribbon, and have a connector such as, without limitation, type SC, LC, or MPO, provided at one or both ends of the cable. For typical applications, a fiber such as EZ-Bend® available from OFS Fitel, LLC, is preferred. EZ-Bend is an ultra bend insensitive fiber that can tolerate copper wire like installations in homes and multi-dwelling units (MDU). The fiber exhibits a macrobending loss of less than 0.1 dB (0.06 dB typical) at 1550 nm over a full turn with a radius of five mm or less.

Figure 3:
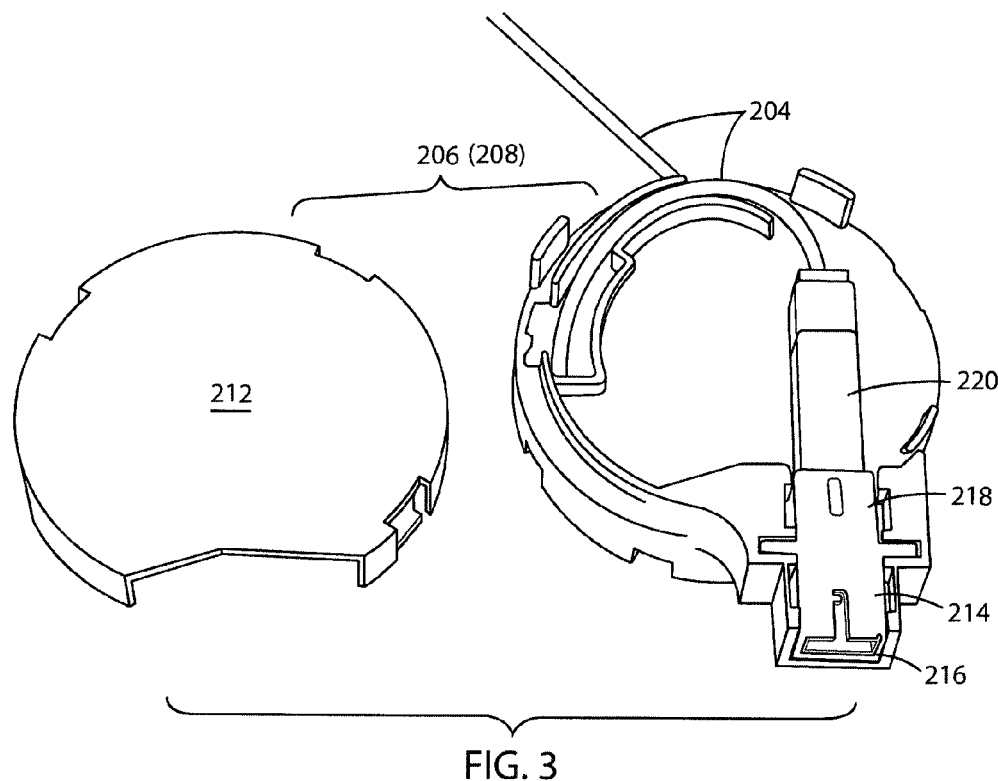
FIG. 3 shows one of two fiber optic cable termination boxes or "rosettes" that may be used with the applicator tool in FIG. 2.
Figure 4:
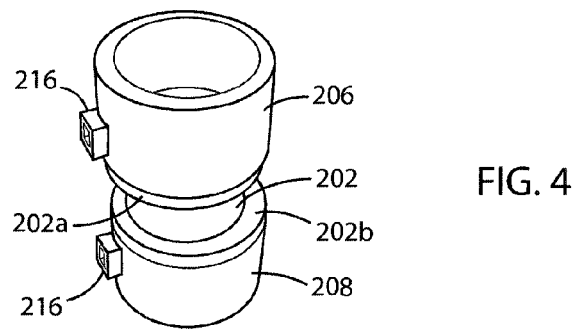
FIG. 4 depicts two of the termination boxes in FIG. 3 removably fastened against corresponding side end flanges of an optical fiber or cable storage spool.
Figure 5:
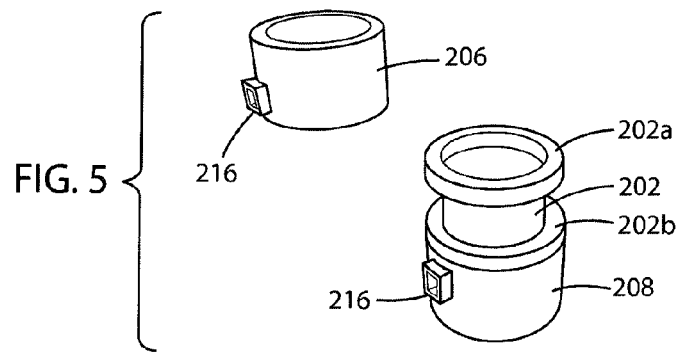
FIG. 5 shows one of the termination boxes in FIG. 4 being removed from the storage spool.
Figure 6:
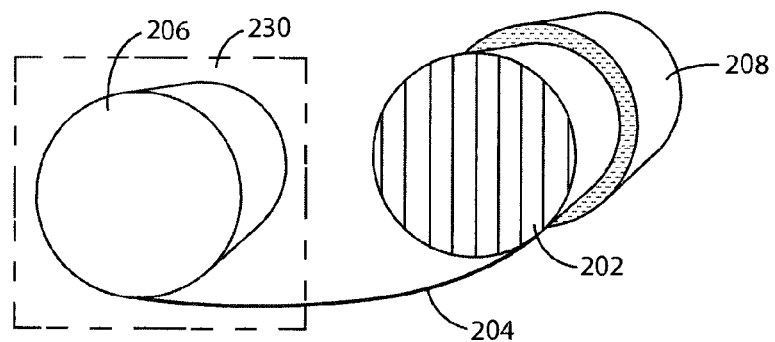
FIG. 6 shows the removed termination box in FIG. 5 fastened at one end of a desired path an over which the fiber is to be routed and adhered on an exposed surface.
Figure 7:
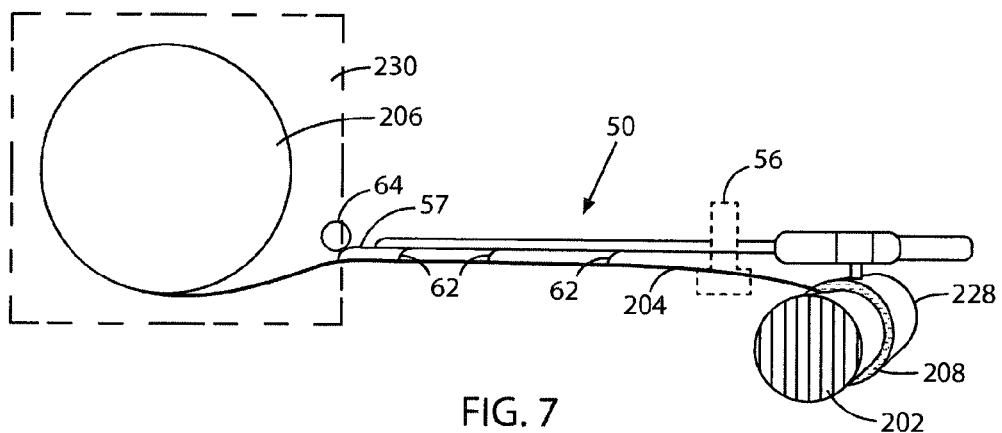
FIG. 7 shows the fiber being routed over the surface using the applicator tool.
Figure 8:
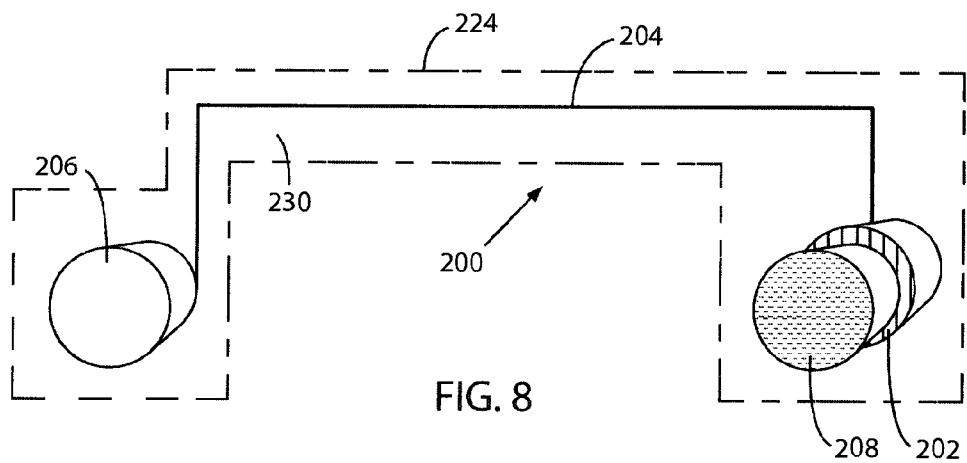
FIG. 8 shows the fiber routed to the other end of the path, and the other termination box and storage spool fastened to the surface at the other end of the path.
Figure 9:
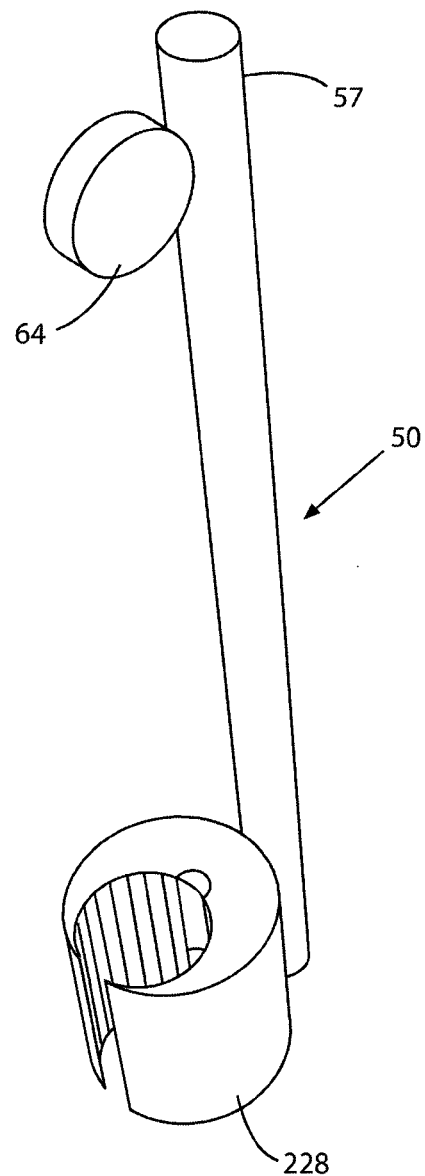
FIG. 9 depicts the applicator tool in FIG. 2, including a mount for supporting an optical fiber or cable storage spool with an optionally attached cable termination box or rosette.

The optical termination boxes 206, 208 may be commercially available units such as, e.g., type J424 or type J418 from OFS Fitel, LLC. One of the termination boxes 206, 208 is illustrated in FIG. 3 with a top cover plate 212 removed. Each box is typically molded from a plastics material such as PVC and includes a standard optical connector adapter 214, as shown in FIG. 3. The adapter 214 is mounted in the box so that so that a distal end 216 of the adapter is accessible from outside the box for connection with a mating connector at one end of, e.g., an incoming provider or drop cable, or a cable leading to user equipment such as a set top box, a communications modem, or the like. The proximal end 218 of the adapter 214 is accessible inside the box 206 for connection with a connector 220 that terminates a corresponding end portion of the spooled fiber 204. As seen in FIG. 3, the end portion of the fiber 204 may enter a lower compartment or other region of the box 206, and be guided over a partial or full circular path so as to maintain a minimum bend radius and provide strain relief for the fiber.

The fiber storage spool 202 and the termination boxes or rosettes 206, 208 may be fabricated and assembled in a factory environment, so that the installer only needs to:

1. Detach one of the termination boxes (e.g., box 206) from the fiber storage spool 202, and attach the box at a first location (via a screw or other fastener) at or near one end of a span 224 over which the fiber 204 is to be routed on a structural surface 230. See FIGS. 6 and 8.

2. Load the other termination box 208 with the attached fiber storage spool 202 into a corresponding mount or cradle 228 on the application tool 50. See FIG. 9. The mount 228 is preferably constructed in a known manner so as to enable the box 208 and the spool 202 to rotate about a common spool axis as the fiber 204 unwinds from the spool. Alternatively and similar to the construction of a conventional spinning type fishing rod, the mount 228 may be arranged to retain the spool 202 and the box 208 in a fixed position, and to guide the fiber 204 to spin about the spool axis as the fiber leaves the spool during routing.

3. Route the fiber 204 over the desired path 224 on the structural surface 230 using the application tool 50. See FIGS. 7 and 8.

4. Remove the other termination box 208 and the storage spool 202 containing any remaining fiber 204 from the tool mount 228, and affix the box and spool at a second location at or near the opposite end of the span 224 over which the fiber was routed on the surface 230. See FIG. 8.

As disclosed herein, an optical fiber or cable is routed over a desired span on a structural surface in a room or office, using a limited amount of hardware and with a minimal form factor to avoid creating unsightly marks along the surface. By selecting an appropriate adhesive, the fiber can be adhered on or recessed within most surfaces normally encountered in residential and commercial living units, namely; wallpaper, sheet rock, painted surfaces, and more durable surfaces such as cement, stone, and marble.

While the foregoing represents preferred embodiments of the invention, it will be understood by those skilled in the art that various modifications and changes may be made without departing from the spirit and scope of the invention, and that the invention includes all such modifications and changes as come within the scope of the following claims.

We claim:

1. A system for routing a desired span of an optical fiber or cable on a structural surface at a given premises, comprising:
a fiber storage spool assembly including a fiber storage spool for storing a length of an optical fiber or cable to be routed, the storage spool assembly including a first optical termination box arranged for fastening to the fiber storage spool, wherein the termination box has an optical connector adapter with a proximal end for connection to a first end of the fiber on the storage spool and a distal end for connection with an outside fiber or cable; and
an optical fiber or cable routing tool including,
a rod including a handle at a proximal end of the rod;
a mount attached to the rod for receiving the fiber storage spool and the optical termination box when fastened to the storage spool, and for supporting the storage spool and the termination box when the fiber is operatively unwound or paid out from the spool;
an adhesive coating assembly for providing an adhesive on the fiber when the fiber is unwound from the spool; and
a fiber routing applicator disposed at a distal end of the rod, wherein the applicator is dimensioned and arranged to travel over the surface, to route the fiber with the adhesive thereon over the desired span while urging the fiber against the surface so that the fiber becomes adhered to the surface.

2. A system according to claim 1, wherein the fiber routing applicator comprises a wheel or a roller.

3. A system according to claim 1, including one or more guide elements fixed along the length of the rod for guiding the fiber from the spool toward the distal end of the rod.

4. A system according to claim 1, wherein the adhesive coating assembly includes an adhesive applicator passage, and the assembly is constructed and arranged to supply a determined quantity of an adhesive substance to the passage for application to the fiber when the fiber is guided to move through the passage.

5. A system according to claim 1, wherein the first optical termination box of the storage spool assembly is constructed and arranged to be fastened at a first location at or near one end of the span over which the fiber is routed on the structural surface.

6. A system according to claim 5, wherein the fiber storage spool assembly includes a second optical termination box having an optical connector adapter with a proximal end for connection to a second end of the fiber on the storage spool opposite the first end of the fiber, and a distal end for connection with an outside fiber or cable.

7. A system according to claim 6, wherein the second optical termination box is constructed and arranged to be fastened at a second location at or near an opposite end of the span over which the fiber is routed on the structural surface.

8. A system according to claim 4, wherein the adhesive coating assembly of the fiber or cable routing tool is constructed and arranged to supply the determined quantity of the adhesive substance to the adhesive applicator passage from an associated cartridge.

* * * * *